United States Patent [19]

Bergler

[11] Patent Number: 5,646,945
[45] Date of Patent: Jul. 8, 1997

[54] TELECOMMUNICATIONS SYSTEM AND TELECOMMUNICATIONS TERMINAL EQUIPMENT

[75] Inventor: Frank Bergler, Niefern, Germany

[73] Assignee: Alcatel N.V., Rijskwijk, Netherlands

[21] Appl. No.: 404,412

[22] Filed: Mar. 15, 1995

[30] Foreign Application Priority Data

Mar. 15, 1994 [DE] Germany ............... 44 08 598

[51] Int. Cl.$^6$ ............... H04M 11/00; H04M 3/42
[52] U.S. Cl. ............... 370/419; 370/420; 370/463; 379/210; 379/211; 379/212
[58] Field of Search ............... 370/62, 110.1, 370/419, 420, 463; 379/210, 211, 212, 213, 215

[56] References Cited

U.S. PATENT DOCUMENTS

| | | |
|---|---|---|
| 4,943,996 | 7/1990 | Baker, Jr. et al. ............... 379/210 |
| 5,175,760 | 12/1992 | Ohashi et al. . |
| 5,327,486 | 7/1994 | Wolff et al. ............... 379/210 |
| 5,422,942 | 6/1995 | Kakwashima ............... 370/62 |
| 5,434,906 | 7/1995 | Robinson et al. ............... 379/210 |

FOREIGN PATENT DOCUMENTS

| | | |
|---|---|---|
| 0330856 | 9/1989 | European Pat. Off. . |
| 3234081 | 3/1984 | Germany . |
| 3426070 | 1/1985 | Germany . |
| 3608238 | 9/1987 | Germany . |
| 3615661 | 11/1987 | Germany . |
| 3722954 | 1/1988 | Germany . |
| 3900364 | 7/1989 | Germany . |
| 3924974 | 5/1990 | Germany . |
| 4024102 | 2/1992 | Germany . |
| 4040678 | 6/1992 | Germany . |
| 4202817 | 8/1993 | Germany . |
| 4303031 | 8/1994 | Germany . |
| 8707801 | 12/1987 | WIPO . |

OTHER PUBLICATIONS

PC User, NR. 226, 12, Jan. 1994 GB, Seiten 54–54, Clare Newsome "Impressive PDA Communication".
IBM Technical Disclosure Bulletin, Bd. 36, Nr. 6B, Jun. 1993 New York, US Seiten 249–250, "Operating System Termination Via Telephone Criteria Reminder".
IBM Technical Disclosure Bulletin, Bd. 36, Nr. 11, Nov. 1993, New York US, Seite 529, "Phonemail ICON Notification and Selection".
Patent Abstracts of Japan, vol. 12, No. 500 (E–699), 27 Dec. 1988 and JP–A–63 211950 (Canon Inc. 5 Sep. 1988.
Hochreuter, Dieter: "ISDN–TK–System integriert Telefax, Teletex, und PC–Kommunikation". In: ntz. Bd. 45, 1992, H.5, S.340–347.
Ducoffre, Hans–Georg: Viehweg, Jurgen: "Alle drei guten Dinge sind eins". In: telcom report 17, 1994, H.1, S.42,43.
Illies, Thomas: "Abwartskompatibel mit modularer PC–Karte". In: Funkschau 6, 1991, S. 89–92.
Bacach, Anatol: "Moderne Strategien fur die DV–und TK–Integration in Unternehmensnetzen". In: ntz, Bd. 46, 1993, H. 7, S.518–525.

(List continued on next page.)

Primary Examiner—Wellington Chin
Assistant Examiner—Soon-Dong Hyun
Attorney, Agent, or Firm—Ware, Fressola, Van der Sluys & Adolphson LLP

[57] ABSTRACT

To produce a telecommunications system and terminal equipment, which brings about immediate action for important incoming calls. User information in an incoming call is evaluated according to predetermined criteria, and a message is sent to the recipient at his current location. The data received as a result of an incoming call are evaluated by a data processing installation or a telecommunications terminal, and a message is dispatched. The message reaches the called party, who is able to retrieve and view all of the data on another communications installation.

14 Claims, 4 Drawing Sheets

OTHER PUBLICATIONS

N.N.: "Look and Feel". In: Funkschau 19, 1993, S. 16–17.

N.N.: "Personliche Digitale Assistenten". In: Funkschau 1, 1994, S.8–15.

ISDN Practices, "The Hanbdbook of New Speech, Text, Picture, Data Communications New Media Association" Ulm MbH; Apr. 93, Chap. 1.3, pp. 18–19.

"Computer on the Telephone Line", Klaus–J. Zschaage, Radio Exhibition 16/1990, pp. 55–58.

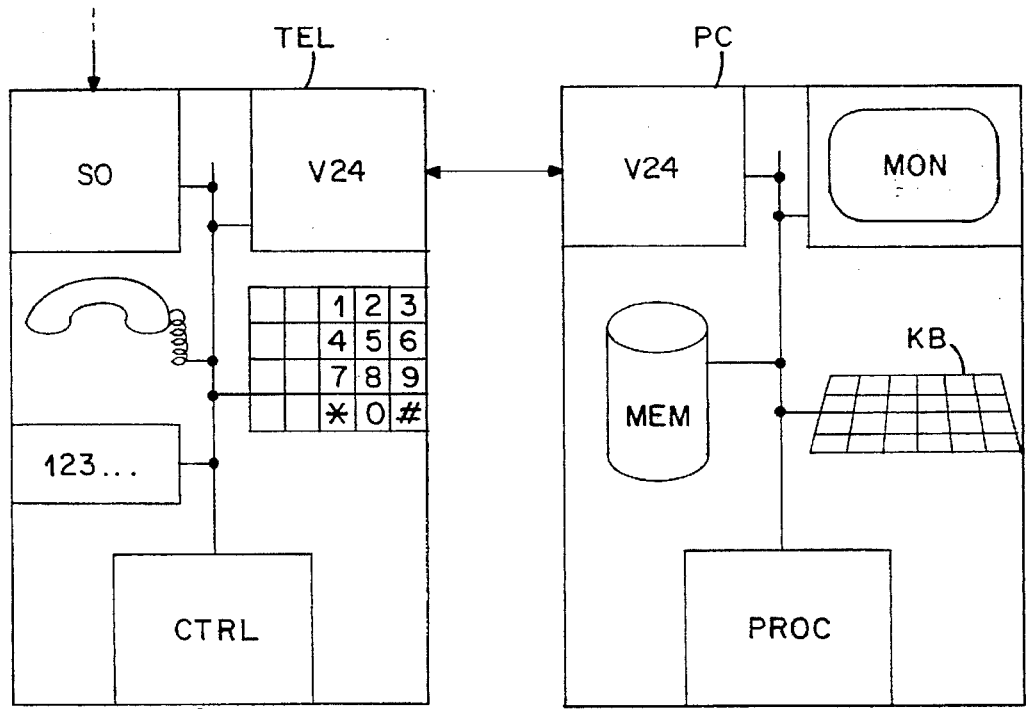
FIG. 4
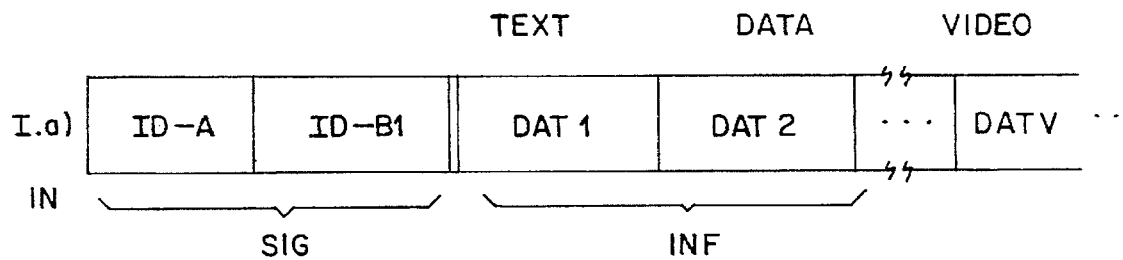
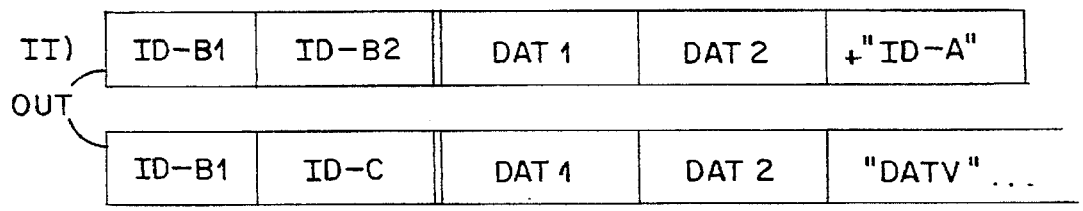
FIG. 5

TELECOMMUNICATIONS SYSTEM AND TELECOMMUNICATIONS TERMINAL EQUIPMENT

TECHNICAL FIELD

The invention concerns a telecommunications system comprising a telecommunications network, at least two telecommunications terminals and other devices or installations connected thereto.

The invention furthermore concerns a telecommunications terminal equipment for use in the telecommunications system.

BACKGROUND OF THE INVENTION

A so-called call forwarding circuit is known in the state of the art. This is a service whereby a call, which is intended for a certain telephone connection X, e.g. a connection in the office, is forwarded to another telephone connection Y, e.g. a private connection. If this service is called, an explanatory text sounds, indicating that the call is being forwarded. An individual text is also possible. However, a premise of this service is that the connection can be reached by dialing (from: ISDN Practices, The Handbook of New Speech, Text, Picture, Data Communications; New Media Association Ulm mbH; 04/93; Chapter 1.3; pages 18–19).

Furthermore, the use of a data processing equipment in conjunction with a telecommunications equipment is known. This conjunction finds broad application particularly in branches and internal operating functions in which telephone work stations are often found, such as in customer services, telephone sales, order receiving, hotels, health facilities, credit installations, etc. ("Computer on the Telephone Line"; Klaus-J. Zschaage; Radio Exhibition 16/1990; pages 55–58).

Lately digital communications installations with handwriting recognition, the so-called Personal-Digital-Assistance, also called PDA or message pads, are finding an ever broader application. These devices recognize notices which are handwritten on a contact-sensitive coating with a special pen. Functions such as e.g. sending a fax, sending a message, also called "mail", take place by connecting a fax-modem, wherein a special field is touched by the pen. Commands can also be entered by handwriting, then are marked and applied ("Look and Feel"; Apple Newton Messagepad; Radio Exhibition 19/1993; pages 16–17).

Other telecommunications terminal equipments are known, which store such user information received as a result of an incoming call (e.g. telephone with call answering). The called party can only react to the incoming call after consulting the stored user information. A selection of the incoming calls does not take place.

SUMMARY OF THE INVENTION

It is the task of the invention to optimize known devices and equipment for a communications installation in an advantageous manner.

The present invention furthermore proposes such a telecommunications terminal equipment, wherein the task is fulfilled at all times, even in the absence of the called party, an immediate reaction to such a call is made possible, where the content is of special importance to the called party.

An advantage of the invention is that a digital communications installation with handwriting recognition can be used in any place where a telecommunications terminal is available, to view data which are stored in a personal computer with a telecommunications connection. For example data, which are newly transmitted to a personal computer, can be recalled at any time and in any place. This is particularly advantageous and useful for testing whether important incoming orders require immediate action, or whether an important telephone call has taken place.

Furthermore, especially important data, which can be marked by entering a special password, and which make immediate action necessary, can be directly informed through this communications installation.

The telecommunications terminal of the present invention contains a data processing terminal, which evaluates the user information of the incoming call, to determine that the incoming call complies with predefined criteria and then sends a message to a telecommunications terminal in the vicinity of which someone, particularly the called party, is located.

According to one aspect of the present invention, a data processing device with integrated telephone function can be used instead of a separate telephone.

According to other aspects of the present invention, data stored in the data processing device can be visualized on the communications installation. The text can then be edited, commented upon or corrected. Preferably a part of the stored text itself can be used to send a message to the digital communications installation with handwriting recognition, which immediately and better informs a receiver about the content of the data.

According to another aspect of the present invention, a list of all of the received calls is created, which contributes to the clear information of the user.

According to a still further aspect of the present invention, telephone directories and calling lists are also present at all times. An individually defined presentation form of a text can be selected at any time by means of so-called display installation functions According to other aspects of the present invention, several telecommunications terminals can be provided with a message from an incoming call, which takes place after individually predefined criteria are checked.

BRIEF DESCRIPTION OF THE DRAWINGS

In the following, the invention will be explained in more detail by means of the following figures representing:

FIG. 4, a schematic assembly of the telecommunications terminal comprising a telecommunications terminal and a personal computer, and FIG. 5, a schematic evaluation of incoming data and the establishment in the personal computer of messages to be transmitted.

BEST MODE FOR CARRYING OUT THE INVENTION

Figure 1:
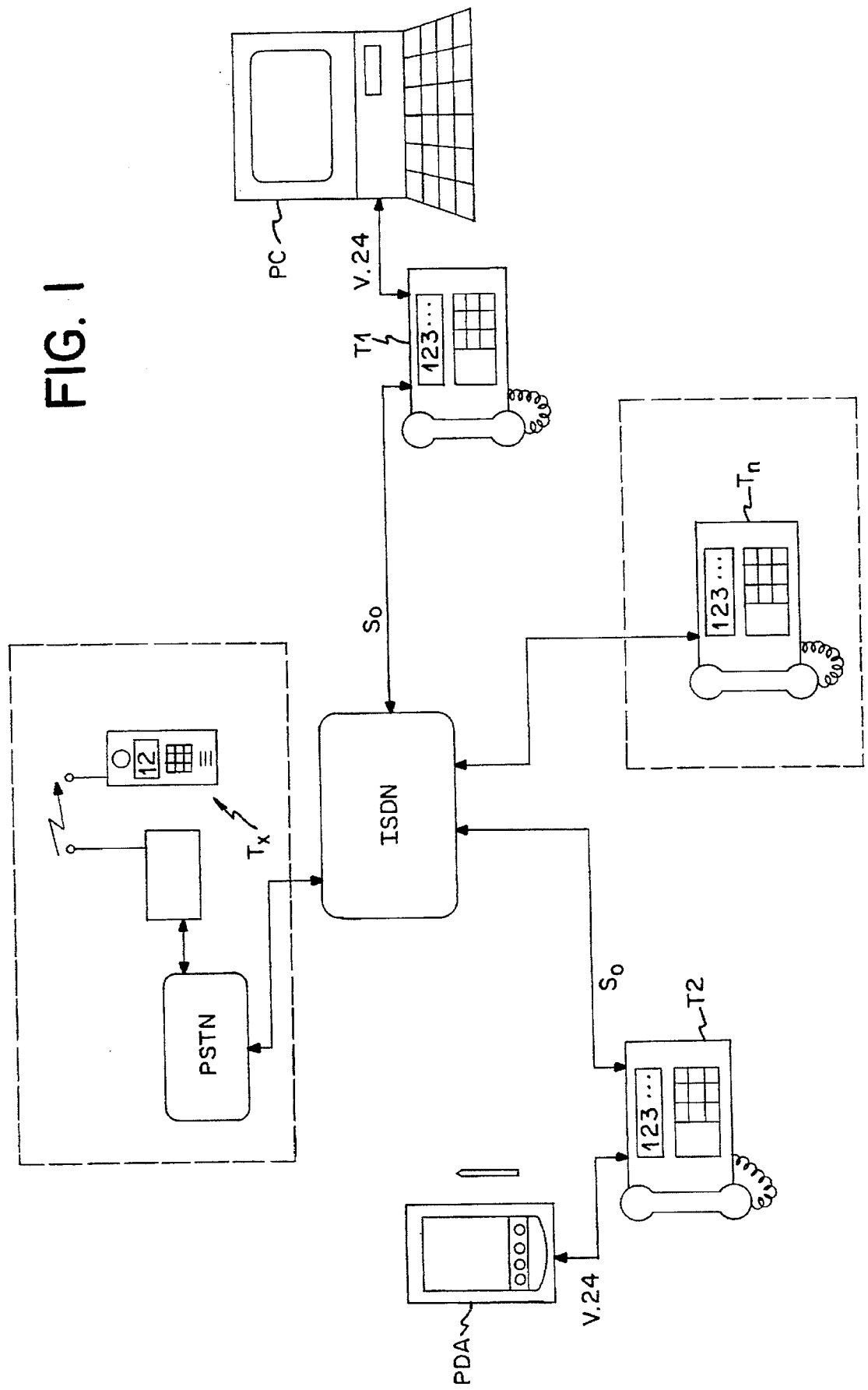
FIG. 1, a block circuit diagram of a communications installation according to the present invention.

The following explains one possible configuration example of the telecommunications system with the aid of FIG. 1.

A telecommunications system comprises a first telecommunications terminal T1 and a data processing terminal PC connected thereto. The telecommunications terminal T1, a telephone for example, is connected through an interface V.24 to the data processing terminal PC, a personal computer for example. The first telecommunications terminal T1, for example, is connected through an interface $S_o$ and a line to a telecommunications network ISDN. At least one other telecommunications terminal T2 is connected to the telecommunications network ISDN, also e.g. through an interface $S_o$. The at least one other telecommunications terminal T2, a telephone for example, is connected to a digital communications installation with handwriting recognition PDA. The digital communications installation with handwriting recognition PDA can be a so-called Personal-Digital-Assistant, a "Pen-Computer", which by means of a special pen, a pressure-sensitive surface and a special software, is in a position to recognize handwriting and convert it into letters. This communications installation with handwriting recognition PDA can also perform functions, either through special markings in the text or by activating a field by means of the pen.

Figure 2:
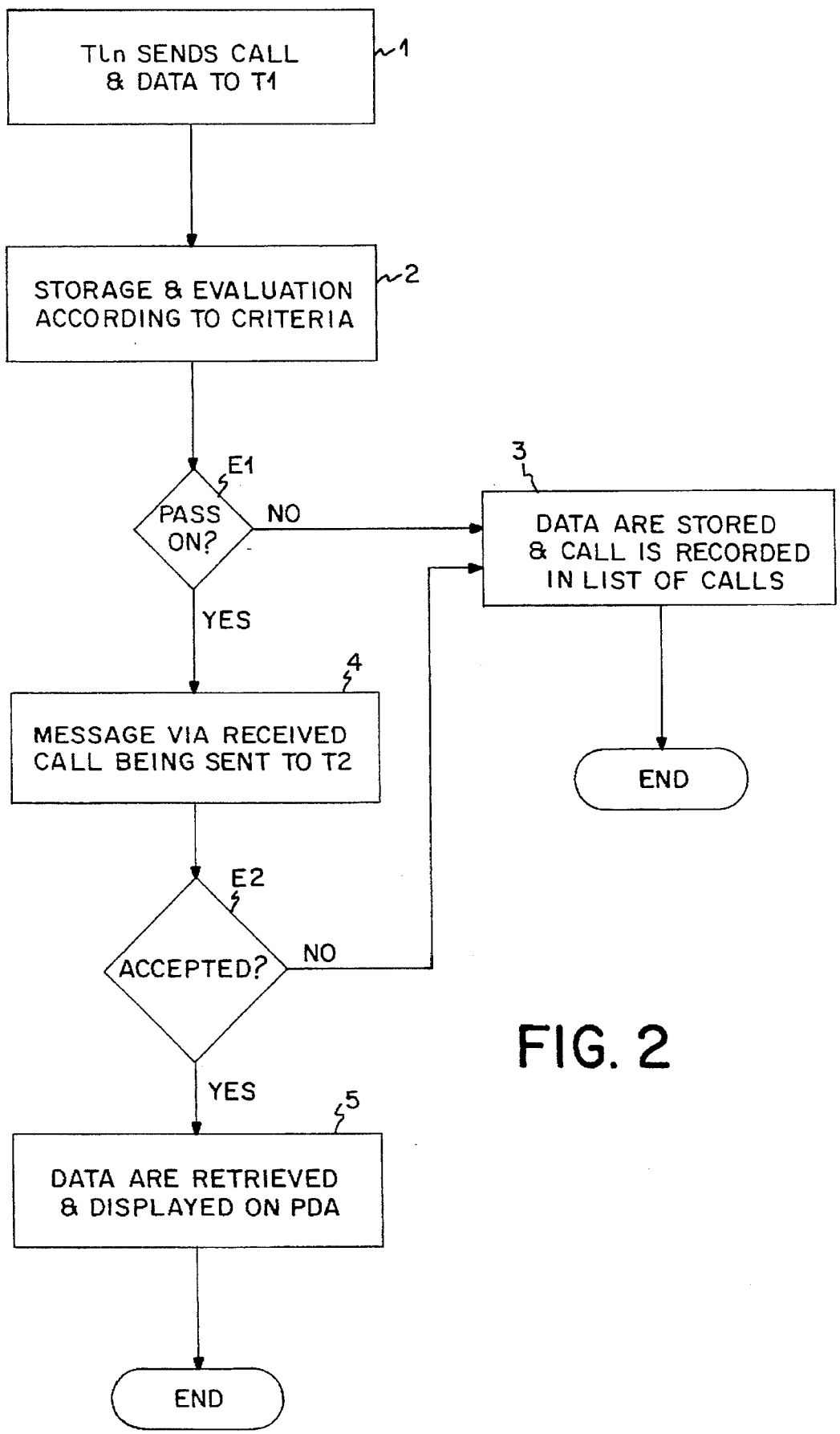
FIG. 2, a flow diagram of the communications installation's use.

One function of the communications device could take place in the following manner and is explained by means of FIG. 2. In a first step 1, a subscriber Tln makes a call and transmits data to a first telecommunications terminal T1 with the data processing terminal PC connected thereto. In this case telecommunications terminal T1 and data processing terminal PC can also be integrated into a data processing terminal with telephone function.

In a second step 2, the number, name and data of the subscriber Tln are stored in the data processing terminal PC. The number, the name and the data are checked for compliance with predefined criteria. One criterion for example could be the name of the calling subscriber, or even the number of pieces of an order, such as "100 each of product X". It would also be possible to fulfill the criteria by means of a name in combination with a code word in the data, such as "urgent". To prevent unauthorized parties from having reading and/or writing access to the data, such accesses can be protected by special passwords. For example, a customer who only requires writing access is provided a different password than the one used by the owner himself, who needs reading and writing access. A first decision element E1 decides whether the criterion or the criteria have been fulfilled, and whether a message from the incoming call should be passed on to another subscriber terminal T2.

In the event the message is to be passed on, the data are stored in a third step and the call is recorded with the date and time in a list of calls, for example.

A message is written, if a message is to be passed on to the at least one other subscriber terminal T2. It can either be a standard notice, such as "Important call recorded!", or be composed of parts of the transmitted data, such as "Order 1000 each of product X!". In a fourth step 4, the message is transmitted to the at least one other telecommunications terminal T2.

A second decision element E2 determines whether the message from the incoming call was accepted. If this is not the case, the above described step 3 is activated.

If the message from the incoming call is accepted, the digital communications installation with handwriting recognition PDA can retrieve and display the stored data in a fifth step 5, through the at least other telecommunication terminal T2. In this way, the precise content of the data can be accurately visualized. It is of course also possible to display only the relevant data.

In this case, data displayed in this manner can be directly edited, corrected and commented upon on the digital communications installation with handwriting recognition PDA. Text data with comments can then be stored again or directly transmitted. Other functions that can be called up by the digital communications installation with handwriting recognition PDA are the reading and editing of lists of calls and telephone directories, among others. The data are stored in the memory of the data processing terminal PC, and are partially transmitted to the communications installation where they are displayed. In addition, a display installation function is available, the so-called White-Boardings function. It can be used to prepare and transmit text in any self-defined text format.

A further development of the invention is explained in the following by means of FIG. 1.

In addition to the above described installations and devices, another telecommunications terminal Tn can be connected to the telecommunications network ISDN, to which a message from the incoming call can also be passed on, or as an alternate to the at least one other telecommunication terminal T2. In the same way another network PSTN, e.g. a private network, can be connected to the telecommunications network ISDN, through which another telecommunications terminal $T_x$ can be connected, e.g. in the form of a radio call receiver. Radio call receivers of today can also announce messages. For example, if a user of the communications installation is reached through a radio call receiver, he or she knows the importance of the incoming call and can use a digital communications installation with handwriting recognition PDA, which e.g. is also connected to a radio network, to view the complete text.

Figure 3:
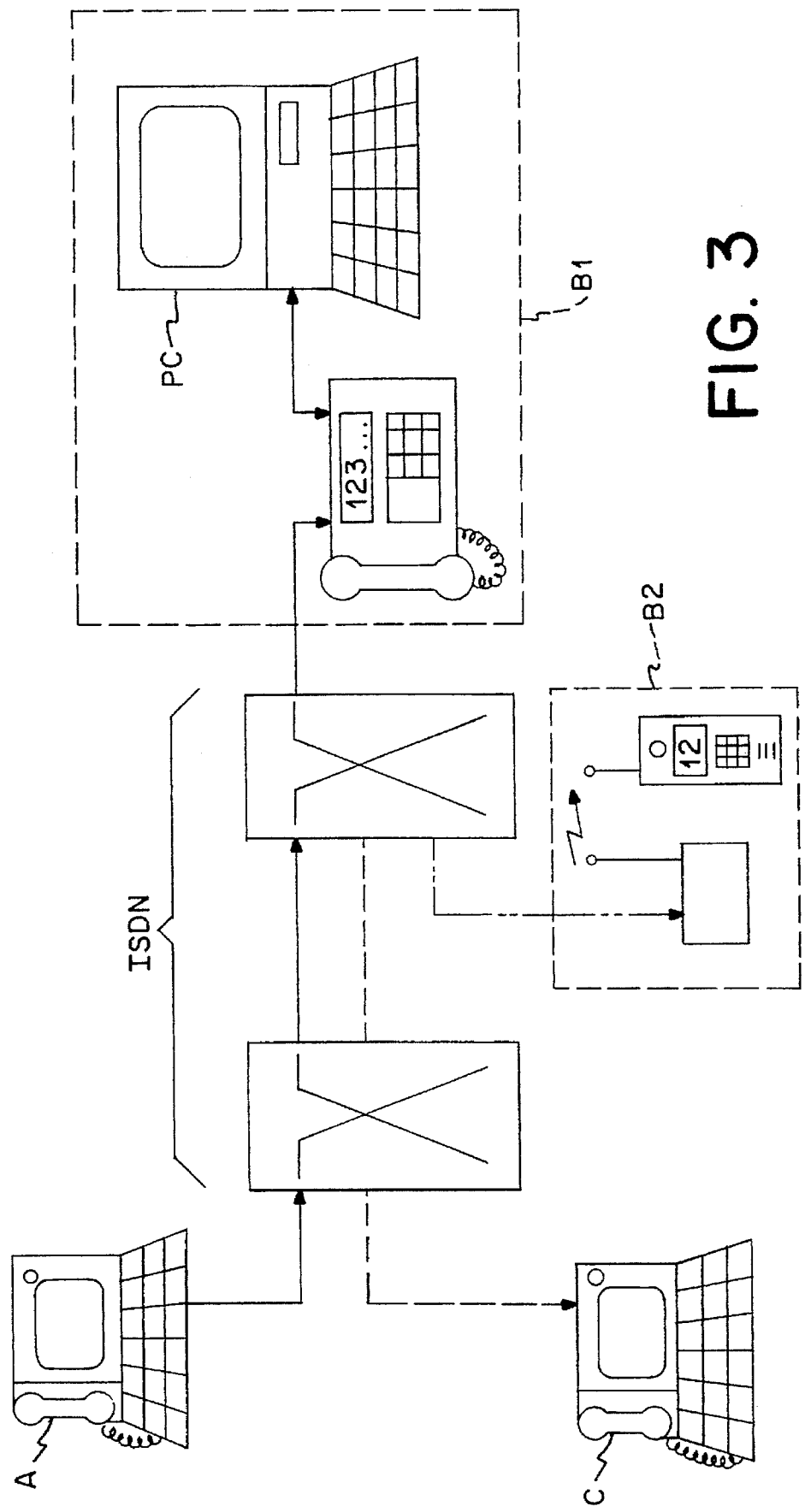
FIG. 3, a simplified illustration of a telecommunications terminal inside a multi-media-capable telecommunications network.

FIG. 3 illustrates a telecommunications network ISDN, in which signalling and user information is digitally transmitted, and which is suitable for the transmission of different services in the sense of a multi-media-capable network. Such a network is the standardized broadband telecommunications network "B-ISDN", for example. A telecommunications terminal B1 according to the invention is connected to the telecommunications network ISDN illustrated schematically in FIG. 3, and contains a data processing terminal PC, which in this instance is a personal computer.

If the called party is not present at the location of the telecommunications terminal B1, he or she should still be able to receive a message from an incoming call, whose content is important. To that effect, the data processing terminal PC evaluates the user information in the incoming call and controls the transmission of messages to at least one other telecommunications installation, such as a short message to a mobile radio telephone B2, where the called party can be reached. The entire content of the incoming call, i.e. all of the user information, which could consists of alpha-numeric data, is stored in the personal computer PC of telecommunications terminal B1, located in the work place of the called party.

If the called party receives the message that caller A has stored a call with "important" information in the telecommunications terminal B1, he or she can take action at his or her momentary location, i.e. the mobile telephone B2. For example, the called party immediately calls caller A back, or first asks the telecommunications terminal B1 to transmit the stored user information to another telecommunications terminal C, possibly located at the residence of the called party. As a result of an incoming call, it is also possible to send a message to each of the two telecommunications terminals B2 and C. The messages can be different and adapted to the respective telecommunications terminal. After that, a short message is sent to mobile telephone B2 and a full text message (total content) to telecommunications terminal C.

In the following, the construction and the operation of the telecommunications terminal B1 is further described as an example:

FIG. 4 depicts a schematic configuration of the telecommunications terminal B1. It contains a telecommunications terminal TEL and a data processing terminal PC connected thereto. The telecommunications terminal TEL is a telephone containing a microprocessor circuit CTRL and two interfaces SO and V24 connected thereto. One of the interfaces SO serves to connect the telephone to a digital communications network, for example the ISDN network. The other interface V24 serves to connect the data processing terminal PC to the telephone.

In this instance, the data processing terminal PC is configured as a personal computer with a central processor PROC, a hard disk memory MEM, a keyboard KB, a screen MON and an interface circuit V24.

With an incoming call, the latter transmits at least the user information to the personal computer PC, which stores the user information, which may contain text, voice and/or graphic data. After that, at least a portion of the user information, such as perhaps individual data fields within text data, are evaluated to check whether the content of the received call is important enough to send a message to the called party who is located elsewhere.

This message is sent by the personal computer PC to the telecommunications terminal which the called party has indicated, or which is selected by signalling the personal subscriber number of the called party. The personal computer PC further controls the preparation of the message so that it only contains those portions of the user information (e.g. alphanumeric data) that can be received by the selected telecommunications terminal (e.g. mobile telephone with alphanumeric display). Furthermore, the message can be further restricted by means of specifications from the called party, i.e. to certain data fields, which perhaps reflect the number of pieces of an order, or prices for an offer of merchandise. Such a message is therefore short and contains the essential information which the called party desires.

The evaluation of the user information in the incoming call and the preparation of messages inside the personal computer PC will now be precisely described by means of FIG. 5-I.a) and I.b) or 5.II).

FIG. 5-I.a) schematically illustrates the content of the incoming call IN, which the telecommunications terminal receives as a data sequence. This data sequence contains signalling information SIC, with an identification ID-A for the calling, and an identification ID-B1 for the called telecommunications terminal. In addition, the data sequence IN contains user information INF, which is composed of different types of data. For example, three different types of data: text, data and video are selected for print characters, numerical characters and graphic characters. The user information INF is subdivided into several data fields DAT1, DAT2, DATV, which are respectively assigned to one of the types of data.

To evaluate the received user information, the personal computer PC compares only a part of the user information, i.e. data from individual data fields DAT1 and DAT2 with predetermined reference data Ref1 or Ref2.

For example, FIG. 5.Ib) illustrates the checking of whether the input in data field DAT1 (customer name) is "Miller", and whether the input in data field DAT2 (number of pieces of the ordered goods) is greater than "10,000". The personal computer PC makes a qualitative selection of the incoming calls by means of these criteria which are predetermined by the user (the called party). The chosen example is a simple one. More complex evaluations of the user information can be envisioned, perhaps with processes for recognizing speech or graphic patterns.

FIG. 5.II) illustrates possible messages created by the personal computer PC and transmitted through the telecommunications terminal TEL, if the content of the incoming call fulfills the predetermined criteria. To that effect, the personal computer PC combines several of the data fields DAT1, DAT2 etc. into a data sequence to be transmitted. To this are added as a signalling information, the identification ID-B1 of the telecommunications terminal B1 and the identification ID-B2 of the telecommunications terminal B2 being called. The message could furthermore contain the decoded identification "ID-A" of the originally calling telecommunications terminal A, i.e. information for identifying the caller. A further message, which contains a part of the graphic data "DATV", is transmitted to another telecommunications terminal C identified by ID-C.

To transmit the messages, the personal computer PC controls, through the interfaces V24, the telecommunications terminal TEL, which performs the recording development 3 for the digital communications network ISDN.

The described configuration example contains all the essential features of the invention. Beyond that, numerous other configuration examples can be envisioned, which are perhaps targeted for highly integrated telecommunications terminals (e.g. multi-media terminals) or for complex telecommunications networks with IN functions (IN: intelligent network, such as UMTS: Universal Mobile Telecommunication System).

What is claimed is:

1. A telecommunications system comprising:
   a first telephone terminal (T1);
   a data processing terminal (PC) Connected to the first telephone terminal (T1);
   second telephone terminal (T2) connected to the first telephone terminal (T1) through a telecommunications network (ISDN);
   digital communications installation having handwriting recognition means (PDA) connected to the second telephone terminal (T2);
   wherein the first telephone terminal (T1) receives and provides an incoming call having data to the data processing terminal (PC); and
   wherein the data processing terminal (PC) stores and evaluates the data to determine whether the data fulfills a predetermined criteria and sends a message to the second telephone terminal (T2) if the predetermined criteria are fulfilled.

2. A telecommunications system as claimed in claim 1, wherein the first telecommunications terminal (T1) and the data processing terminal (PC) connected thereto are a computer with integrated telephone function.

3. A telecommunications system as claimed in claim 2, wherein the message in the incoming call is composed of a part of transmitted data.

4. A telecommunications system as claimed in claim 3, wherein the digital communications installation with the handwriting recognition (PDA) establishes a connection by means of the second telephone terminal (T2) to the first telecommunications terminal (T1) and the data processing terminal (PC) connected thereto, and the data processing terminal (PC) transmits the data stored therein to the digital communications installation, where the data is visualized in the form of text.

5. A telecommunications system as claimed in claim 4, wherein the text can be edited, corrected or commented upon, and these actions can be stored in the data processing terminal (PC).

6. A telecommunications system as claimed in claim 5, wherein a list of received calls is created in the data processing terminal (PC), which is displayed on the digital communications installation with handwriting recognition (PDA).

7. A telecommunications system as claimed in claim 6, wherein lists of calls, telephone directories and display installation functions are transmitted between the data processing terminal (PC) and the digital communications installation.

8. A telecommunications system as claimed in claim 7, wherein the message in the incoming call is transmitted to other telecommunications terminals (Tn).

9. A telecommunications system as claimed in claim 1, wherein the data processing terminal (PC) is a computer under software control to check the predetermined criteria, to check names or telephone numbers of a calling subscriber, and to check data contents for signal values and passwords of access-entitled subscribers.

10. A telecommunications terminal equipment (B1) having a data processing terminal (PC) connected thereto, that evaluates in accordance with predetermined criteria (Ref1, Ref2) user information (DAT1, DAT2; text, data) received by the telecommunications terminal equipment (B1) as a result of an incoming call (In), and that controls a transmission of a message (Out) to at least one other telecommunications terminal equipment (B2, C) if the predetermined criteria (Ref1, Ref2) is fulfilled, wherein the data processing terminal (PC) receives data as user information assigned to different data fields (DAT1, DAT2), and wherein the data processing terminal (PC) only evaluates a part of the user information by comparing the data from only one, two or a few of the data fields (DAT1) with reference data (Ref1), which are specified according to the predetermined criteria (Ref1, Ref2).

11. A telecommunications terminal equipment (B1) having a data processing terminal (PC) connected thereto, that evaluates in accordance with predetermined Criteria (Ref1, Ref2) user information (DAT1, DAT2; text, data) received by the telecommunications terminal equipment (B1) as a result of an incoming call (In), and that controls a transmission of a message (Out) to at least one other telecommunications terminal equipment (B2, C) if the predetermined criteria (Ref1, Ref2) is fulfilled, wherein the data processing terminal (PC) receives data assigned to different types of data (audio, video, text, data) as user information, and wherein the data processing terminal (PC) only evaluates a part of the user information, by comparing the data from only one, two or a few of the data types (text, data) with reference data (Ref1, Ref2), which are specified according to the predetermined criteria (Ref1, Ref2).

12. A telecommunications terminal equipment (B1) as claimed in claim 11, which contains a personal computer as the data processing terminal (PC) and which, for connecting the personal computer to a telecommunications network (ISDN), contains an interface circuit (Se), which recognizes the incoming call (In) and then activates the personal computer (P) for evaluation of the user information.

13. A telecommunications system as claimed in claim 1, wherein the digital communications installation with the handwriting recognition (PDA) establishes a connection, by means of the second telephone terminal (T2) to the first telephone terminal (T1) and the data processing terminal (PC) connected thereto, and the data processing terminal (PC) transmits the data stored therein to the digital communications installation, where the data is visualized in the form of text.

14. A telecommunications terminal equipment (B1) as claimed in claim 10, which contains a personal computer as the data processing terminal (PC) and which, for connecting the personal computer to a telecommunications network (ISDN), contains an interface circuit (Se), which recognizes the incoming call (In) and then activates the personal computer (P) for evaluation of the user information.

* * * * *

UNITED STATES PATENT AND TRADEMARK OFFICE
CERTIFICATE OF CORRECTION

PATENT NO. : 5,646,945
DATED : July 8, 1997
INVENTOR(S) : Frank Bergler

It is certified that error appears in the above-identified patent and that said Letters Patent is hereby corrected as shown below:

Column 6, Claim 1, Line 43, --a-- should be inserted before "digital".

Column 6, line 40, insert --a-- before "second".

Signed and Sealed this

Tenth Day of March, 1998

Attest:

Attesting Officer

BRUCE LEHMAN

Commissioner of Patents and Trademarks